(12) United States Patent
Su (10) Patent No.: US 9,916,285 B2
(45) Date of Patent: Mar. 13, 2018

(54) GENERATING A PREVIEW OF A WEB PAGE FOR A MOBILE TERMINAL

(71) Applicant: UC MOBILE LIMITED, Beijing (CN)

(72) Inventor: Jiannan Su, Beijing (CN)

(73) Assignee: UC MOBILE LIMITED, Beijing (CN)

(*) Notice: Subject to any disclaimer, the term of this patent is extended or adjusted under 35 U.S.C. 154(b) by 42 days.

(21) Appl. No.: 14/901,598

(22) PCT Filed: Jan. 10, 2014

(86) PCT No.: PCT/CN2014/070478
§ 371 (c)(1),
(2) Date: Dec. 28, 2015

(87) PCT Pub. No.: WO2014/206072
PCT Pub. Date: Dec. 31, 2014

(65) Prior Publication Data
US 2016/0371229 A1 Dec. 22, 2016

(30) Foreign Application Priority Data

Jun. 28, 2013 (CN) .......................... 2013 1 0269515

(51) Int. Cl.
*G06F 17/00* (2006.01)
*G06F 17/21* (2006.01)
(Continued)

(52) U.S. Cl.
CPC ........ *G06F 17/211* (2013.01); *G06F 3/04883* (2013.01); *G06F 17/2235* (2013.01);
(Continued)

(58) Field of Classification Search
None
See application file for complete search history.

(56) References Cited

U.S. PATENT DOCUMENTS 8,578,261 B1 * 11/2013 Gupta ............... G06F 17/30899
715/205
2008/0134093 A1 6/2008 Dharmarajan et al.
(Continued)

FOREIGN PATENT DOCUMENTS

CN 101042695 A 9/2007
CN 101102255 1/2008
(Continued)

OTHER PUBLICATIONS

PCT International Search Report dated Apr. 3, 2014, issued in corresponding International Application No. PCT/CN2014/070478 (5 pages).
(Continued)

*Primary Examiner* — Asher D Kells (57) ABSTRACT

Embodiments of the present disclosure provide methods and systems for previewing a web page. The methods include: sending a web page previewing request to a middleware server in accordance with a web page previewing triggering instruction; loading, by the middleware server, a main document of a web page link requested to be previewed in accordance with the web page previewing request, and typesetting the main document; and partially capturing the typeset main document and uniformly scaling the captured typeset main document in accordance with a screen size of a mobile terminal to generate a preview image for the mobile terminal to display. With the present disclosure, a web page can be rapidly previewed, thereby reducing the waiting time of a user.

21 Claims, 3 Drawing Sheets

(51) Int. Cl.
*G06F 17/30* (2006.01)
*G06F 3/0488* (2013.01)
*G06F 17/22* (2006.01)
*G06T 3/40* (2006.01)

(52) U.S. Cl.
CPC .... *G06F 17/2247* (2013.01); *G06F 17/30905* (2013.01); *G06T 3/40* (2013.01); *G06F 2203/04808* (2013.01)

(56) References Cited

U.S. PATENT DOCUMENTS

2014/0136973 A1* 5/2014 Kumar .............. G06F 17/30902 715/274
2014/0289597 A1* 9/2014 Kim ................... G06F 17/2247 715/205

FOREIGN PATENT DOCUMENTS

| CN | 101977233 | 2/2011 |
|---|---|---|
| CN | 102200971 | 9/2011 |
| CN | 102682093 A | 9/2012 |
| CN | 102799654 A | 11/2012 |
| CN | 103023870 | 4/2013 |
| CN | 103353886 A | 10/2013 |

OTHER PUBLICATIONS

International Written Opinion for PCT/CN2014/070478, dated Apr. 3, 2014.
International Preliminary Report on Patentability for PCT/CN2014/070478, dated Dec. 29, 2015, 6 pages.
First Notice issued by China State Intellectual Property Office, dated Dec. 15, 2015 for Chinese Patent Application No. 201310269515.7 with search report.
Second Notice issued by China State Intellectual Property Office, dated Aug. 23, 2016 for Chinese Patent Application No. 201310269515.7 with search report.
Third Notice issued by China State Intellectual Property Office, dated Mar. 15, 2017 for Chinese Patent Application No. 201310269515.7.

* cited by examiner

FIG. 1

System 200 for previewing a web page

GENERATING A PREVIEW OF A WEB PAGE FOR A MOBILE TERMINAL

CROSS-REFERENCE TO RELATED APPLICATION

This is a national stage application of International Application No. PCT/CN2014/070478, filed on Jan. 10, 2014, which claims priority to and benefits of Chinese Patent Application No. 201310269515.7, filed on Jun. 28, 2013. The contents of both of the above-referenced applications are herein incorporated by reference in their entirety.

TECHNICAL FIELD

The present disclosure relates to the field of web page browsing technologies, and more particularly, to methods and systems for previewing a web page.

BACKGROUND

The rise of the Internet has changed the way we work and the lifestyles we lead. The Internet is characterized by its interconnectivity, openness, and information sharing, which no longer limits the dissemination of information to traditional paper media. People can acquire information that they want to know through web pages.

In the process of browsing a web page, to jump to a next page after browsing one page is completed, a user clicks a link to the next page. However, after the user clicks the link to the next page, the user cannot immediately see the content of the next page, but can see the content after a browser loads the content of the next page. Therefore, during the process that the browser executes loading of the content of the next page, the user can wait, which leads to a waste of time and a poor user experience.

At present, some browsers may have intelligent readahead through "next **" (for example, "page down"), and may preload a web page in the background by "opening in the background" the web page to achieve rapid pre-loading, thereby reducing the user's waiting time so as to achieve rapid viewing of the web page. During the pre-loading process, the whole web page is loaded in the background, but in most cases, the pre-loaded web page may not be what the user likes. Therefore, it is likely that the user may give up continuing to browse the pre-loaded web page after reading a few sentences, but the whole web page has been loaded completely at this point, thus resulting in "ineffective loading" and waiting time for the user.

SUMMARY

A main objective of the present disclosure is to provide methods and systems for previewing a web page, so as to reduce the waiting time of a user.

In order to achieve the aforementioned objective, according to one aspect of the present disclosure, a method for previewing a web page is provided. The web page previewing method may include:

receiving a typeset main document from a middleware server, in which the typeset main document is a document obtained by loading a main document of a web page link requested to be previewed in accordance with a web page previewing request after the middleware server receives the web page previewing request sent in accordance with a web page previewing triggering instruction, and by typesetting the main document; and partially capturing the typeset main document and uniformly scaling the captured typeset main document in accordance with a screen size of a mobile terminal to generate a preview image for the mobile terminal to display.

Further, prior to the receiving a typeset main document from a middleware server, the method further includes:

sending the web page previewing request to the middleware server in accordance with the web page previewing triggering instruction; and loading, by the middleware server, a main document of a web page link requested to be previewed in accordance with the web page previewing request, and typesetting the main document.

Further, the web page previewing triggering instruction is generated in accordance with a two-finger long press action on the web page link.

Further, the typesetting the main document includes: typesetting a first preset region of the main document.

Further, the partially capturing the typeset main document and uniformly scaling the captured typeset main document in accordance with a screen size of a mobile terminal to generate a preview image includes: determining a second preset region of the main document in accordance with a web page body content; partially capturing the typeset main document in accordance with the second preset region of the main document to generate a screenshot of the web page body content; and uniformly scaling the screenshot of the web page body content in accordance with a screen size of the mobile terminal to generate a preview image.

Further, the partially capturing the typeset main document and uniformly scaling the captured typeset main document in accordance with a screen size of a mobile terminal to generate a preview image for the mobile terminal to display includes: obtaining a web page from the typeset main document; and partially capturing the web page and uniformly scaling the captured web page in accordance with a screen size of the mobile terminal to generate a preview image for the mobile terminal to display.

Further, after a partially captured image is uniformly scaled down, the image may be processed by compressing the image and/or by reducing the image quality at first, and then the processed image is returned to a browser of the mobile terminal.

In order to achieve the aforementioned objective, according to one aspect of the present disclosure, a system for previewing a web page is provided, including:

a receiving unit, which may receive a typeset main document from a middleware server, in which the typeset main document is a document obtained by loading a main document of a web page link requested to be previewed in accordance with a web page previewing request after the middleware server receives the web page previewing request sent in accordance with a web page previewing triggering instruction, and by typesetting the main document; and a previewing unit, which may partially capture the typeset main document and uniformly scale the captured typeset main document in accordance with a screen size of a mobile terminal to generate a preview image for the mobile terminal to display.

Further, the system for previewing a web page may further include a previewing request unit and a typesetting unit, and the previewing unit may include a preview image generation unit and a display unit, in which:

the previewing request unit may send the web page previewing request to the middleware server in accordance with the web page previewing triggering instruction;

the typesetting unit of the middleware server may load a main document of a web page link requested to be previewed in accordance with the previewing request, and typeset the main document;

the preview image generation unit may partially capture the typeset main document and uniformly scale the captured typeset main document in accordance with a screen size of the mobile terminal to generate a preview image; and the display unit may display the preview image.

Further, the system for previewing a web page may further include: a previewing triggering unit, which may generate the web page previewing triggering instruction in accordance with a two-finger long press action on the web page link.

Further, the typesetting unit may typeset a first preset region of the main document.

Further, the preview image generation unit may further include: a second preset region determination unit, which may determine a second preset region of the main document in accordance with a web page body content; a web page body content screen-capture unit, which may partially capture the typeset main document in accordance with the second preset region of the main document to generate a screenshot of the web page body content; and a uniform scaling unit, which may uniformly scale the screenshot of the web page body content in accordance with a screen size of the mobile terminal to generate a preview image.

Further, the previewing unit may obtain a web page from the typeset main document, and may partially capture the web page and uniformly scale the captured web page in accordance with a screen size of the mobile terminal to generate a preview image for the mobile terminal to display.

In order to achieve the aforementioned objective, according to one aspect of the present disclosure, a computer-readable medium having processor executable program codes is provided, in which, when executed, the program codes may cause a processor to execute the following steps of: receiving a typeset main document from a middleware server, in which the typeset main document is a document obtained by loading a main document of a web page link requested to be previewed in accordance with a web page previewing request after the middleware server receives the web page previewing request sent in accordance with a web page previewing triggering instruction, and by typesetting the main document; and partially capturing the typeset main document and uniformly scaling the captured typeset main document in accordance with a screen size of a mobile terminal to generate a preview image for the mobile terminal to display.

In order to achieve the aforementioned objective, according to one aspect of the present disclosure, a computer program is provided in which the computer program is used for performing the method for previewing a web page according to the present disclosure.

By use of the aforementioned methods and systems for previewing a web page according to the present disclosure, before a web page is loaded, a middleware server may load and typeset contents of a main Document Object Model (DOM), partially capture the typeset main document, and uniformly scale the captured typeset main document in accordance with a screen size of a mobile terminal to generate a preview image, allowing a user to preview a first small part of the web page in advance, and the user can decide accordingly whether to perform full web page loading for the web page or not, so as to reduce the waiting time of the user.

In order to achieve the aforementioned and related objectives, one or more aspects of the present disclosure include features that will be described in detail hereinafter and specifically pointed out in the claims. The following description and the accompanying drawings describe in detail some exemplary aspects of the present disclosure. However, these aspects indicate some manners that can use the principle of the present disclosure. In addition, the present disclosure is intended to include all of these aspects and their equivalents.

BRIEF DESCRIPTION OF THE DRAWINGS

Other objectives and results of the present disclosure will become clearer and be easier to understand by referring to the following description with reference to the accompanying drawings and in combination with the contents of the claims, and with more comprehensive understanding of the present disclosure. In the drawings:

The same reference numbers in the accompanying drawings refer to same, similar, or corresponding features or functions.

DETAILED DESCRIPTION

Embodiments of the present disclosure are described below in detail in combination with the accompanying drawings.

The embodiments of the present disclosure are based on a mobile browser of a client/server architecture. As during the pre-loading of the existing methods, a middleware server can provide a web page for a user to view after loading of the whole web page is completed, resulting in waiting time for the user. With respect to the aforementioned problem, the embodiments of the present disclosure use a middleware server to acquire a main document from a website server. Then the middleware server generates an image of a first small part of the body content of a web page to be previewed, and compresses the image. The compressed image is returned to a mobile terminal browser, so that the a first small part of the web page can be previewed in advance without a complete loading of the whole web page. Thus the user may decide accordingly whether to perform complete loading of the whole web page, to reduce "ineffective loading", thereby reducing the waiting time of the user.

As described herein, the mobile terminal involved in the embodiments of the present disclosure mainly refers to terminals that use a mobile terminal browser and the mobile Internet for accessing the network, such as mobile phones.

Figure 1:
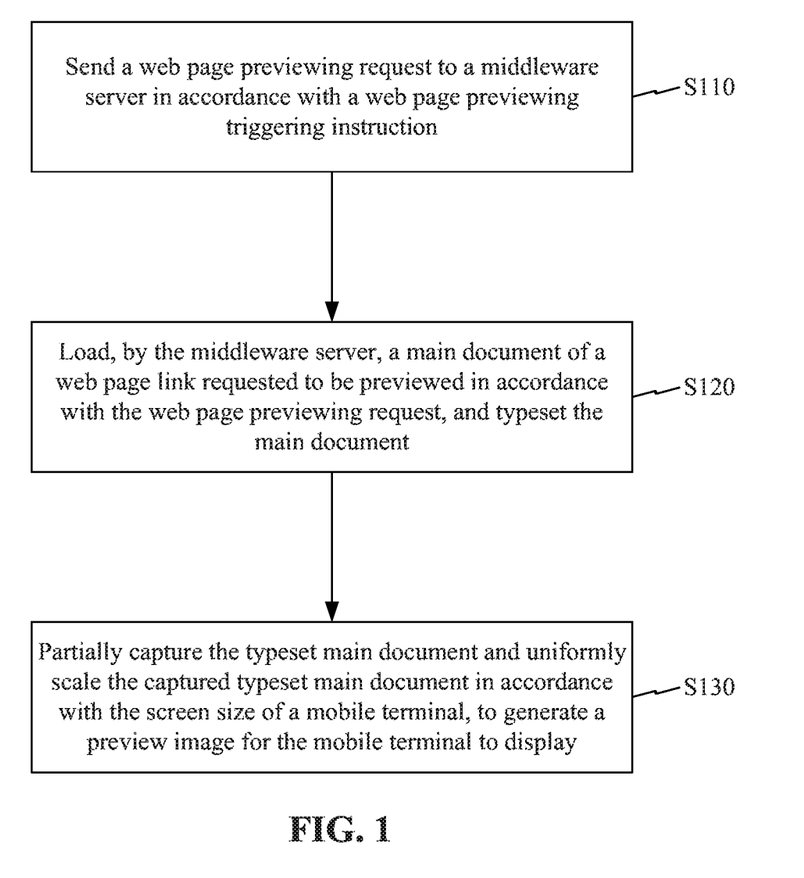
FIG. 1 is a flow chart illustrating a method for previewing a web page, according to an embodiment of the present disclosure.

In order to describe the methods for previewing a web page provided in the embodiments of the present disclosure in detail, FIG. 1 is a flow chart illustrating a method for previewing a web page, according to an embodiment of the present disclosure.

As shown in FIG. 1, the method for previewing a web page provided in the embodiment of the present disclosure includes:

S110: sending a web page previewing request to a middleware server in accordance with a web page previewing triggering instruction;

S120: loading, by the middleware server, a main document of a web page link requested to be previewed in accordance with the web page previewing request, and typesetting the main document; and S130: partially capturing the typeset main document and uniformly scaling (i.e., performing uniform scaling of the captured typeset main document) in accordance with the screen size of a mobile terminal to generate a preview image for the mobile terminal to display.

For example, a web page can be obtained from the typeset main document, and a preview image is obtained by partially capturing the web page.

In step S110, the web page previewing triggering instruction is generated in accordance with a two-finger long press action on the web page link.

In step S120, the middleware server may typeset a first preset region of the main document. The first preset region may be set by a service provider or the user. The middleware server may not need to typeset the whole main document, and may need to complete typesetting of a part of the document to be captured in step S130. Accordingly, the less the data of the main document typeset by the middleware server is, the faster the speed at which the user previews the web page is. In one embodiment of the present disclosure, the first preset region may start at a half from the top of the web page, and may also start at one-third from the top of the web page.

As the processing capability of the middleware server is much higher than that of the mobile terminal, the loading and typesetting of the main document are performed by the middleware server, which can reduce the data processing burden of the mobile terminal.

In step S130, partially capturing the typeset main document and uniformly scaling the captured typeset main document in accordance with a screen size of a mobile terminal to generate a preview image further includes: determining a second preset region of the main document in accordance with a web page body content; partially capturing the typeset main document in accordance with the second preset region of the main document to generate a screenshot of the web page body content; and uniformly scaling the screenshot of the web page body content in accordance with a screen size of the mobile terminal to generate a preview image.

The second preset region can display the part of the web page body content, which may substantially display the original appearance of the web page body content. In one embodiment of the present disclosure, the second preset region is a rectangular region of x pixels*y pixels starting from the top of the first region, in which x represents a transverse coordinate, the value of x is less than or equal to the width of the first preset region, and y represents a longitudinal coordinate, and the value of y is less than or equal to the length of the first preset region. The captured part, that is, the rectangular region of x pixels*y pixels, displays a substantially original appearance of this part of the web page body content.

Moreover, as the display space of a display screen of the mobile terminal is limited, it is likely that an image generated by partially capturing the typeset web page is not suitable for display in the mobile terminal browser. Thus the image generated from the partially captured typeset main document is uniformly scaled according to a fixed proportion or a demand of the corresponding mobile terminal. For example, an image of 480*800 pixels may be proportionally scaled to 48*80 pixels and the like, which may allow the mobile terminal browser to directly display the image without any subsequent processing after receiving the image, thus further increasing efficiency of rapid previewing.

Figure 3A:
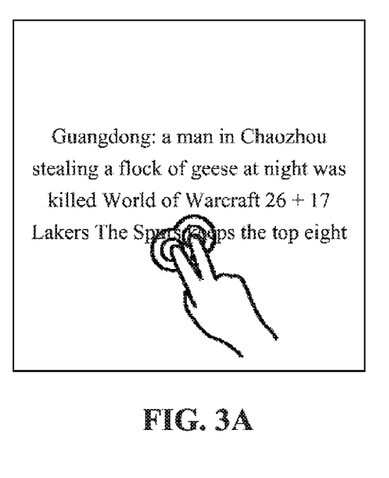
FIG. 3A, FIG. 3B, and FIG. 3C are exemplary views of displays of a mobile terminal for previewing a web page, according to an embodiment of the present disclosure.
Figure 3B:
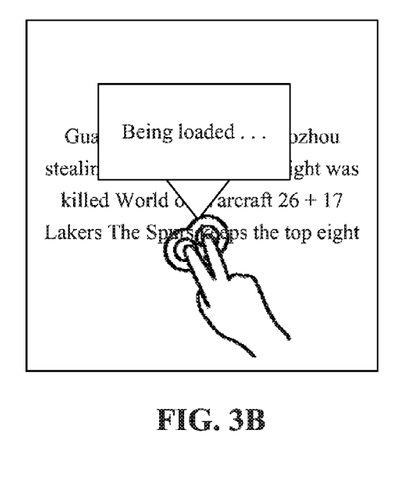
Figure 3C:
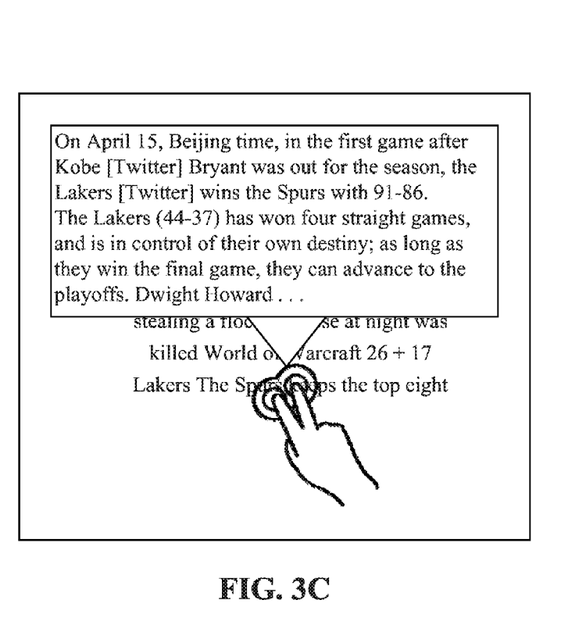

FIG. 3A, FIG. 3B, and FIG. 3C are exemplary views of displays of a mobile terminal for previewing a web page, according to an embodiment of the present disclosure. When a mobile terminal browser sends a previewing request to a middleware server, a small window will pop up on a web page. While loading of the web page has not been completed, "being loaded" is displayed in the window as shown in FIG. 3B. After loading of the web page is completed, loaded web page contents are displayed in the window as shown in FIG. 3C. For example, after the mobile terminal browser receives the preview image, the preview image will be displayed in the window, and the user, at this point, can rapidly preview the web page requested to be previewed.

As described herein, a scaling factor may be set in accordance with a ratio of a web page to be browsed to a screen size of a mobile terminal, such that a preview image displayed on the mobile terminal is neither too small or too big. The scaling factor may be adjusted in accordance with comfort of human eyes, and the value of the scaling factor is not used to limit the protection scope of the present disclosure.

In addition, after the typeset main document is partially captured to generate an image (i.e., partially captured image) and the image is uniformly scaled, the image may be processed, such as by compressing and/or reducing the image quality of the partially captured image, and then the processed image is sent to the mobile terminal browser for display, so as to reduce data usage of the user and increase the efficiency of rapid previewing.

In the embodiments of the present disclosure, the middleware server may load a main document (e.g., main DOM) of a web page link, and may not load external CSS, external JS, and external images in the DOM. Therefore, the size of the resource to be loaded is much less than the size of the resource of a full web page if loaded, which allows loading to be completed in a shorter amount of time. The image generated by partially capturing the typeset web page is uniformly scaled at first and then is sent or returned to a mobile terminal, which can save some data usage, increase loading speed under the same bandwidth, and better facilitate rapid previewing of the web page.

At the same time, as it is the middleware server that goes to a website server to load a main document of a web page link, much faster wired broadband is used, whose network speed is more stable and much faster. This allows loading to be completed very quickly between dozens to hundreds of milliseconds, for example, and thus the time of the loading can be further reduced to achieve the goal of rapid previewing.

In addition, the main document of the web page or the web page link in the embodiments of the present disclosure is also called main DOM, and refers to a main part of an http web page document, which is data of an http master request, and does not include external CSS files, external javascript files, and external image files. For example, 1) the main document does not include external CSS files cited in a head label of an html, e.g., <link rel="stylesheet" type="text/css" href="style.css"/>;

2) the main document does not include external javascript files cited in an html document, e.g., <script src="http://u1.sinaimg.cn/upload/cms/script/sina_cn/zepto.min.js" fer></script>; and 3) the main document does not include cited images in a web page, e.g., <img src="/i/eg_tulip.jpg" alt="Shang Hai Xian Hua Gang-Yu Jin Xiang"/>.

As described herein, a DOM (Document Object Model) may have access to and modify content and structure of a document in a manner independent of a platform and a language. That is, DOM is a manner that indicates and processes an HTML or XML document. Loading a main DOM (e.g., main document) means loading the main parts of the DOM, but the parts that may have substantial effect on rapid previewing of a web page, such as external CSS, external javascript files, and external images in the DOM, are not loaded.

However, due to typesetting, the main document (e.g., main DOM) includes internal CSS in the document (that is, CSS directly written in the document), and thus typesetting of the main document can display most of the original appearance of the web page, which can meet the demand for previewing the web page by users.

As shown in the flow chart of FIG. 1 that, according to the method for previewing a web page provided in the embodiments of the present disclosure, contents of a main document of a web page link are loaded through a middleware server, but other contents are not loaded. After the main document is loaded, captured contents of a first small part of a web page corresponding to the web page link are returned quickly, that is, captured contents of a part of the main document of the web page are returned, then the captured contents are displayed for the user to preview through a browser, thereby allowing for rapid previewing the web page in advance and achieving the goal of reducing the waiting time of the user.

The middleware server may generate an image from a first small part of a web page to be previewed. The image goes through processing, such as uniform scaling and compression, and thus the size of the image is further reduced and the mobile terminal browser can obtain a screenshot, i.e., the image, within a shorter time. Because the screenshot is displayed, which allows the mobile terminal browser to perform a reduced amount of analyzing, typesetting, and rendering processes that are performed for ordinary web pages, the loading time of the web page is further reduced so that the user can rapidly preview contents of the web page.

In terms of the user, as the user previews a small part of captured contents of the web page link and it is not necessary to spend lots of waiting time, the user can judge whether it is necessary to perform full page loading in accordance with the part of the captured contents. If the user is interested in the contents, full page loading can be performed on the web page. If the user is not interested in the contents, it is not necessary to perform full page loading on the web page, thus reducing ineffective loading and reducing the waiting time of the user.

In addition, the methods for previewing a web page provided in the embodiments of the present disclosure are applicable to text links with a longer title, for example, a text link with a title having more than 6 Chinese characters. Generally, the body contents of such types of web pages may not change greatly, and thus, through rapid previewing, the user can preview a first small part of the contents of the web page in advance and the user can decide accordingly whether to perform full web page loading or not. For a text link with a shorter title, it is generally a special topic or a web page module, the contents therein are often changed or updated, and rapid previewing of such web pages may not be used.

In the embodiments of the present disclosure, the user triggers a rapid web page previewing function of the mobile terminal browser by long pressing a web page link or through other convenient interaction manner. In one example of the present disclosure, the user triggers the rapid web page previewing function by long pressing a target text link (i.e., a web page link) with two fingers. That is to say, the web page previewing triggering instruction is a two-finger long-press action on the web page link.

After the rapid web page previewing function is triggered, the mobile terminal browser sends a web page previewing request to the middleware server, the middleware server loads a main document of a web page link requested to be previewed in accordance with the web page previewing request, and before the web page is loaded, some elements are recognized and extracted in accordance with a predetermined rule, that is, contents of the main document of the web page link are loaded and processed, e.g., typesetting. In the process that the middleware server loads a main document of a web page link requested to be previewed, the middleware server makes a request for loading the main document of the web page link from website server, and then the middleware server typesets the loaded main document of the web page link.

After the main document is rapidly typeset, a first small part of contents of the web page is captured to generate an image and the image is uniformly scaled, then the uniformly scaled image is returned to the mobile terminal server, and the mobile terminal server displays the scaled and/or compressed image through a small pop-up window.

A program used for performing the methods for previewing a web page according to the embodiments of the present disclosure may be stored in a computer-readable storage medium. Thus, the embodiments of the present disclosure further provide a computer readable medium having processor executable program codes, in which, when executed, the program codes cause a processor to execute the following steps of: receiving a typeset main document from a middleware server, in which the typeset main document is a document obtained by loading a main document of a web page link requested to be previewed in accordance with a web page previewing request after the middleware server receives the web page previewing request sent in accordance with a web page previewing triggering instruction, and by typesetting the main document; and partially capturing the typeset main document and uniformly scaling the captured typeset main document in accordance with a screen size of a mobile terminal to generate a preview image for the mobile terminal to display.

In addition, typically, the mobile terminal described in the present disclosure may be various handheld terminal devices, for example, mobile phones, personal digital assistants (PDAs), and the like, and thus the protection scope of the present disclosure should not be limited to a certain specific type of mobile terminal.

In addition, the method according to the present disclosure may also be implemented as a computer program executed by a CPU. When the computer program is executed by the CPU, the aforementioned functions defined in the methods of the present disclosure are executed.

In addition, the method steps and system units may also be implemented by making use of a controller and a computer-readable storage device used for storing a computer program that causes the controller to implement the steps or functions of the units.

In addition, it should be understood that the computer-readable storage device (for example, a memory) described herein may be a volatile memory or a nonvolatile memory, or may include both the volatile memory and the nonvolatile memory. As an example, rather than being restrictive, the nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM), and the RAM may serve as an external cache memory. As an example rather than being restrictive, the RAM may be obtained in many forms, for example, a synchronous RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct Rambus RAM (DRRAM). The storage device in the aspects disclosed is intended to include, but is not limited to, these and other suitable types of memories.

Those skilled in the art should also understand that various exemplary logic blocks, units, circuits, and algorithm steps described in the disclosure can be implemented as electronic hardware, computer software, or a combination thereof. In order to clearly describe such interchangeability of hardware and software, general description has been provided in terms of functions of various schematic components, blocks, modules, circuits, and steps. Whether such functions are implemented as software or hardware depends on specific applications and design constraints applied to the whole system. Those skilled in the art can implement the functions in various manners for each specific application, but such a decision of implementation should not be construed as departing from the scope of the present disclosure.

The various exemplary logic blocks, units, and circuits described in the disclosure can be implemented or executed by using at least one of the following parts designed to be used to execute the functions or steps described herein: a general-purpose processor, a digital signal processor (DSP), an application-specific integrated circuit (ASIC), a field programmable gate array (FPGA) or other programmable logic devices, a discrete gate or transistor logic, discrete hardware components or any combination of the parts. The general-purpose processor may be a microprocessor, but, alternatively, the processor may be any traditional processor, controller, microcontroller, or state machine. The processor may also be implemented as a combination of computing devices, for example, a combination of a DSP and a microprocessor, multiple microprocessors, a combination of one or more microprocessors and a DSP core, or any other such configuration.

The method or algorithm steps described in the disclosure can be directly included in a hardware, a software unit executed by a processor, or a combination of them. The software unit may reside in a RAM memory, a flash memory, a ROM memory, an EPROM memory, an EEPROM memory, a register, a hard disk, a removable disk, a CD-ROM, or any other form of storage medium known in the art. An exemplary storage medium is coupled to a processor so that the processor can read information from the storage medium or write information into the storage medium. In an alternative scheme, the storage medium may be integrated together with the processor. The processor and the storage medium may reside in an ASIC. The ASIC may reside in a user terminal. In an alternative scheme, the processor and the storage medium may reside in a user terminal as discrete components.

In one or more examples, the functions or steps may be implemented in hardware, software, firmware, or any combination thereof. If the functions or steps are implemented in software, the functions can be stored on a computer-readable medium as one or more instructions or codes or be transmitted through a computer-readable medium. The computer-readable medium includes a computer storage medium and a communication medium, and the communication medium includes any medium that helps to transmit a computer program from one position to another position. The storage medium may be any available medium accessible to a general-purpose or special-purpose computer. As an example rather than being restrictive, the computer-readable medium may include a RAM, a ROM, an EEPROM, a CD-ROM or other compact disc storage devices, disk storage devices or other magnetic storage devices, or any other mediums that can be used to carry or store required program codes in the form of instructions or data structures and are accessible to a general-purpose or special-purpose computer or a general-purpose or special-purpose processor. In addition, any connection can be suitably called a computer-readable medium. For example, if software is sent from a website, a server, or other remote source by using a coaxial cable, a fiber optic cable, a twisted pair line, a digital subscriber line (DSL) or wireless technologies, such as infrared, radio and microwaves, the coaxial cable, the fiber optic cable, the twisted pair line, the DSL or the wireless technologies, such as infrared, radio, and microwaves, are all included in the definition of the medium. As used herein, the magnetic disk and the CD-ROM include a compact disc (CD), a laser disc, an optical disc, a digital versatile disc (DVD), a floppy disc, and a blue-ray disc, in which the magnetic disk usually magnetically represents data, while the CD-ROM optically represents data by using laser. Combinations of the contents may also be included in the range of the computer-readable medium.

Although the contents disclosed previously illustrate exemplary embodiments of the present disclosure, it should be noted that various changes and modifications can be made not departing from the scope of the present disclosure defined by the claims. Functions, steps, and/or actions of process claims in accordance with the disclosure embodiments described herein do not need to be executed in any specific order. In addition, although elements of the present disclosure can be described or required in individual forms, they may also be used in combinations, unless the number thereof is explicitly limited as a singular number.

Figure 2:
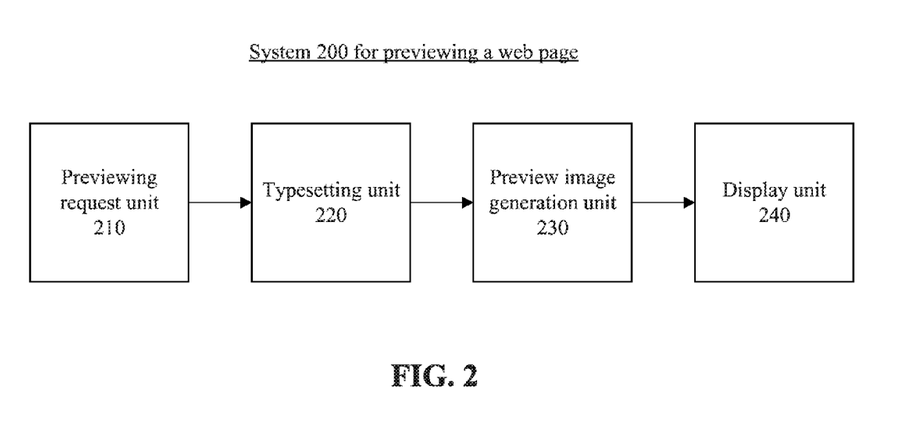
FIG. 2 is a schematic block diagram illustrating a system for previewing a web page, according to an embodiment of the present disclosure.

Corresponding to the aforementioned methods, an embodiment of the present disclosure provides systems for previewing a web page. FIG. 2 is a schematic block diagram illustrating a system for previewing a web page, according to an embodiment of the present disclosure.

As shown in FIG. 2, a system 200 for previewing a web page provided in the present disclosure includes a previewing request unit 210, a typesetting unit 220, a preview image generation unit 230, and a display unit 240.

Previewing request unit 210 sends a web page previewing request to a middleware server in accordance with a web page previewing triggering instruction; typesetting unit 220 loads a main document of a web page link requested to be previewed in accordance with the web page previewing request, and typesets the main document; preview image generation unit 230 partially captures the typeset main document and uniformly scales the captured typeset main document in accordance with a screen size of a mobile terminal to generate a preview image; and display unit 240 displays the preview image. Typesetting unit 220 may belong to the middleware server.

In addition, system 200, provided in the embodiments of the present disclosure, further includes a previewing triggering unit (not shown), which triggers web page previewing in a mobile terminal browser in accordance with a two-finger long press on the web page link.

The previewing triggering unit generates the web page previewing triggering instruction in accordance with a two-finger long press action on the web page link.

The typesetting unit typesets a first preset region of the main document.

The preview image generation unit further includes:

a second preset region determination unit, which determines a second preset region of the main document in accordance with a web page body content;

a web page body content screen-capture unit, which partially captures the typeset main document in accordance with the second preset region of the main document to generate a screenshot of the web page body content; and a uniform scaling unit, which uniformly scales the screenshot of the web page body content in accordance with a screen size of the mobile terminal to generate a preview image.

In order to enhance browsing experience of users without affecting other operations of the users, when the mobile terminal browser displays the processed image, the image is displayed through a small pop-up window so as to facilitate the user previewing web page contents.

The methods and systems for previewing a web page, provided in the embodiments of the present disclosure, acquire a main document from a website server by using a middleware server and return to a mobile terminal browser some (generally a first small part) of the content of a web page, which has been processed, scaled down, or compressed in a captured form, thus reducing the time for loading the web page and user's waiting time.

The methods and systems for previewing a web page, according to the present disclosure, have been described in exemplary embodiments as above with reference to the accompanying drawings. However, those skilled in the art should understand that various modifications can also be made to the methods and systems for previewing a web page described in the present disclosure while not departing from the contents of the present disclosure. Therefore, the protection scope of the present disclosure should be determined by the contents of the following claims.

What is claimed is:

1. A method for previewing a web page, comprising:
receiving a typeset main document from a middleware server, wherein the typeset main document is obtained by loading a main document of a web page link requested to be previewed in accordance with a web page previewing request after the middleware server receives the web page previewing request sent in accordance with a web page previewing triggering instruction, and by typesetting at least a part of the main document, and wherein loading the main document excludes loading an external CSS (Cascading Style Sheet) associated with the main document, and typesetting the main document includes writing an internal CSS into the main document; and
capturing at least the part of the typeset main document and scaling the captured typeset main document in accordance with a screen size of a mobile terminal to generate a preview image for the mobile terminal to display.

2. The method of claim 1, prior to the receiving a typeset main document from a middleware server, further comprising:
sending the web page previewing request to the middleware server in accordance with the web page previewing triggering instruction; and
loading, by the middleware server, the main document of the web page link requested to be previewed in accordance with the web page previewing request, and typesetting the main document.

3. The method of claim 1, wherein the web page previewing triggering instruction is generated in accordance with a two-finger long press action on the web page link.

4. The method of claim 1, further comprising:
typesetting a first preset region of the main document.

5. The method of claim 4, further comprising:
determining a second preset region of the main document in accordance with a web page body content;
capturing at least the part of the typeset main document in accordance with the second preset region of the main document to generate a screenshot of the web page body content; and
scaling the screenshot of the web page body content in accordance with the screen size of the mobile terminal to generate the preview image.

6. The method of claim 1, further comprising:
obtaining at least a part of a web page from the typeset main document; and
capturing at least the part of the web page and scaling the captured web page in accordance with the screen size of the mobile terminal to generate the preview image for the mobile terminal to display.

7. The method of claim 1, further comprising processing the preview image by compressing the image and/or reducing the image quality, and then returning the processed image to a browser of the mobile terminal.

8. A system for previewing a web page, comprising:
a receiving unit that receives a typeset main document from a middleware server, wherein the typeset main document is obtained by loading a main document of a web page link requested to be previewed in accordance with a web page previewing request after the middleware server receives the web page previewing request sent in accordance with a web page previewing triggering instruction, and by typesetting at least a part of the main document, and wherein loading the main document excludes loading an external CSS (Cascading Style Sheet) associated with the main document, and typesetting the main document includes writing an internal CSS into the main document; and
a previewing unit that captures at least the part of the typeset main document and scales the captured typeset main document in accordance with a screen size of a mobile terminal to generate a preview image for the mobile terminal to display.

9. The system of claim 8, further comprising a previewing request unit and a typesetting unit, wherein the previewing unit comprises a preview image generation unit and a display unit, wherein:
the previewing request unit sends the web page previewing request to the middleware server in accordance with the web page previewing triggering instruction;

the typesetting unit loads the main document of the web page link requested to be previewed in accordance with the previewing request, and typesets the main document;

the preview image generation unit captures the typeset main document and scales the captured typeset main document in accordance with the screen size of the mobile terminal to generate the preview image; and the display unit displays the preview image.

10. The system of claim 8, further comprising:

a previewing triggering unit that generates the web page previewing triggering instruction in accordance with a two-finger long press action on the web page link.

11. The system of claim 9, wherein the typesetting unit typesets a first preset region of the main document.

12. The system of claim 11, wherein the preview image generation unit further comprises:

a second preset region determination unit that determines a second preset region of the main document in accordance with a web page body content;

a web page body content screen-capture unit that captures at least the part of the typeset main document in accordance with the second preset region of the main document to generate a screenshot of the web page body content; and a scaling unit that scales the screenshot of the web page body content in accordance with the screen size of the mobile terminal to generate the preview image.

13. The system of claim 8, wherein the previewing unit obtains at least a part of a web page from the typeset main document, and captures at least the part of the web page and scales the captured web page in accordance with a screen size of the mobile terminal to generate the preview image for the mobile terminal to display.

14. A mobile terminal browser, comprising the system of claim 8.

15. A computer-readable medium having processor executable program codes, when executed, causing a processor to execute the following steps of:

receiving a typeset main document from a middleware server, wherein the typeset main document is obtained by loading a main document of a web page link requested to be previewed in accordance with a web page previewing request after the middleware server receives the web page previewing request sent in accordance with a web page previewing triggering instruction, and by typesetting at least a part of the main document and wherein loading the main document excludes loading an external CSS (Cascading Style Sheet) associated with the main document, and typesetting the main document includes writing an internal CSS into the main document; and capturing at least the part of the typeset main document and scaling the captured typeset main document in accordance with a screen size of a mobile terminal to generate a preview image for the mobile terminal to display.

16. A method for previewing a web page, comprising:

receiving a web page previewing triggering instruction;

sending a web page previewing request in accordance with the web page previewing triggering instruction to a middleware server to request to preview a web page link;

receiving at least a part of a main document of the web page link typeset by the middleware server from the middleware server, wherein the typeset main document excludes an external CSS (Cascading Style Sheet) associated with the main document and includes an internal CSS written by the middleware server;

capturing at least the part of the typeset main document; and scaling the captured typeset main document in accordance with a screen size of a mobile terminal to generate a preview image for the mobile terminal to display.

17. The method of claim 16, further comprising generating the web page previewing triggering instruction in accordance with a two-finger long press action on the web page link.

18. The method of claim 16, wherein a first preset region of the main document is typeset.

19. The method of claim 18, further comprising:

determining a second preset region of the main document in accordance with a web page body content;

capturing at least the part of the typeset main document in accordance with the second preset region of the main document to generate a screenshot of the web page body content; and scaling the screenshot of the web page body content in accordance with the screen size of the mobile terminal to generate the preview image.

20. The method of claim 16, further comprising:

obtaining at least a part of a web page from the typeset main document, capturing at least the part of the web page, and scaling the captured web page in accordance with a screen size of the mobile terminal to generate the preview image for the mobile terminal to display.

21. A computer-readable medium storing instructions that, when executed by a computer, cause the computer to perform operations comprising:

receiving a web page previewing triggering instruction;

sending a web page previewing request in accordance with the web page previewing triggering instruction to a middleware server to request to preview a web page link;

receiving at least a part of a main document of the web page link typeset by the middleware server from the middleware server, wherein the typeset main document excludes an external CSS (Cascading Style Sheet) associated with the main document and includes an internal CSS written by the middleware server;

capturing at least the part of the typeset main document; and scaling the captured typeset main document in accordance with a screen size of a mobile terminal to generate a preview image for the mobile terminal to display.

* * * * *